(12) United States Patent
Huang et al.

(10) Patent No.: US 11,975,395 B2
(45) Date of Patent: May 7, 2024

(54) BTA DRILLING QUICK-STOP DEVICE AND METHOD

(71) Applicant: SHANDONG UNIVERSITY, Shandong (CN)

(72) Inventors: Chuanzhen Huang, Jinan (CN); Binghao Li, Jinan (CN); Hanlian Liu, Jinan (CN); Hongtao Zhu, Jinan (CN); Bin Zou, Jinan (CN); Peng Yao, Jinan (CN); Jun Wang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 317 days.

(21) Appl. No.: 17/618,692

(22) PCT Filed: Jan. 15, 2021

(86) PCT No.: PCT/CN2021/072168
§ 371 (c)(1),
(2) Date: Dec. 13, 2021

(87) PCT Pub. No.: WO2022/126816
PCT Pub. Date: Jun. 23, 2022

(65) Prior Publication Data
US 2022/0404238 A1 Dec. 22, 2022

(30) Foreign Application Priority Data
Dec. 18, 2020 (CN) .......................... 202011506448.2

(51) Int. Cl.
*B23B 41/02* (2006.01)
*B23B 49/00* (2006.01)
(52) U.S. Cl.
CPC .................................. *B23B 49/003* (2013.01)

(58) Field of Classification Search
CPC . B23B 47/28; B23B 2247/00; B23B 2260/12; B23B 49/003; B23B 41/02
See application file for complete search history.

(56) References Cited

U.S. PATENT DOCUMENTS 2,976,748 A * 3/1961 Quick .................... B23B 47/28
408/72 R
5,556,241 A 9/1996 Hipwell et al.

FOREIGN PATENT DOCUMENTS

CN 2751949 Y 1/2006
CN 101450391 A 6/2009
(Continued)

OTHER PUBLICATIONS

Shi et al.; "Development and Test Research on a Quick-Stop Device for Metal Cutting;" Machinery Design & Manufacture; 2013; pp. 128-133; Issue No. 10.
(Continued)

*Primary Examiner* — Alan Snyder
(74) *Attorney, Agent, or Firm* — Oliff PLC

(57) ABSTRACT

A BTA drilling quick-stop device (QSD) and a method, wherein the BTA drilling QSD includes a base. The base includes a hollow cavity. A side portion of the base has an opening communicating with the hollow cavity. The opening is closed by a through cover. A horizontally movable fixture is disposed in the hollow cavity. A stopper is disposed at a top portion of the base. A bottom portion of the stopper is disposed lower than a top portion of the fixture to stop the fixture from moving during processing. An elastic element is disposed between the through cover and a side portion of the fixture to push the fixture to move after processing.

8 Claims, 2 Drawing Sheets

(56) References Cited

FOREIGN PATENT DOCUMENTS

| CN | 201862790 U | 6/2011 |
|---|---|---|
| CN | 103128319 A | 6/2013 |
| CN | 107116238 A | 9/2017 |
| CN | 107511492 A | 12/2017 |
| CN | 108436116 A | 8/2018 |
| CN | 211218801 U | 8/2020 |
| TW | 457146 B | 10/2001 |

OTHER PUBLICATIONS

Qing et al.; "Research on Hardened 42CrMo Saw-tooth Chip by Trial with Spring Type Quick-stop Device;" China Mechanical Engineering; 2016; pp. 308-314; vol. 27, No. 3.

Wu et al.; "A new electromagnetic quick stop device for metal cutting studies;" Int J Adv Manuf Technol; 2006; pp. 853-859; vol. 29.

Aug. 26, 2021 Search Report issued in International Patent Application No. PCT/CN2021/072168.

Aug. 26, 2021 Written Opinion of the International Searching Authority issued in International Patent Application No. PCT/CN2021/072168.

Aug. 18, 2021 Office Action issued in Chinese Patent Application No. 202011506448.2.

\* cited by examiner

BTA DRILLING QUICK-STOP DEVICE AND METHOD

TECHNICAL FIELD

The present invention belongs to the technical field of drilling machine accessories, and in particular, to a BTA drilling quick-stop device (QSD) and a method.

BACKGROUND

Descriptions herein only provide background techniques related to the present invention, and do not necessarily constitute the related art.

A QSD is a special machine tool accessory for rapidly separating a tool from a workpiece material at a sufficiently high speed within an extremely short time to extract a chip root sample in a cutting area at a moment during metal cutting. After being made into a metallographic specimen, the chip root sample can be used to observe and measure a shear angle of a cutting deformation zone, a chip curl angle, a tool build-up edge, and the like, and is further of positive significance for guiding scientific production by describing the metal cutting process and studying the mechanism of metal cutting deformation.

A BTA drill is an inner-chip removal deep hole drill, adopting horizontal drilling. A workpiece needs to be tightened by a coolant supply to perform cutting in a closed environment. Chips and a coolant are discharged from the inside of a drill rod. Most of the existing QSDs belong to the technical field of lathing, and only a few are a drilling process of a twist drill. The inventor finds that a QSD of a twist drill generally adopts vertical drilling, has relatively high requirements for the processing accuracy of a drilling workpiece and the depth of a drill hole, and cannot satisfy the requirements of extracting a chip root in BTA horizontal drilling.

SUMMARY

In view of the deficiencies of the related art, an objective of the present invention is to provide a BTA drilling QSD and a method. The device is a horizontal deep hole drilling machine accessory, which is reusable and easy to operate. The device has low requirements for the processing accuracy of a workpiece and the depth of a drill hole, and can satisfy the requirements of extracting a chip root in BTA horizontal drilling.

In order to achieve the above objective, the present invention is implemented through the following technical solution:

In a first aspect, embodiments of the present invention provide a BTA drilling QSD, including a base, where the base includes a hollow cavity, a side portion of the base is provided with an opening communicating with the hollow cavity, the opening is closed by a through cover, a horizontally movable fixture is disposed in the hollow cavity, a stopper is disposed at a top portion of the base, a bottom portion of the stopper is disposed lower than a top portion of the fixture to stop the fixture from moving during processing, and an elastic element is disposed between the through cover and a side portion of the fixture to push the fixture to move after processing.

As a further technical solution, the top portion of the base is provided with a through hole, the stopper extends into the hollow cavity through the through hole from an outer portion of the base, and the side portion of the fixture is abutted against a side portion of the stopper when the stopper blocks the fixture.

As a further technical solution, the elastic element includes a pressure spring, the pressure spring is fixed at a side portion of the through cover, the pressure spring is fixedly connected to an ejector rod, and the ejector rod is abutted against the side portion of the fixture.

As a further technical solution, the fixture includes an accommodating space for accommodating a workpiece, the side portion of the fixture is provided with an opening, and the opening in the side portion of the fixture communicates with the accommodating space for the workpiece to extend out of the fixture.

As a further technical solution, the opening in the side portion of the fixture is arranged in a same direction with the opening in the side portion of the base.

As a further technical solution, a screw clamping mechanism is disposed at the top portion and the side portion of the fixture to clamp a workpiece at a side portion and a top portion of the workpiece.

As a further technical solution, the base includes a damper disposed at a rear portion of the cavity.

As a further technical solution, a guide rail is fixedly disposed in the hollow cavity, and a slide chute is disposed at a bottom portion of the fixture to cooperate with the guide rail.

As a further technical solution, the through cover is provided with a through hole for a drill bit to enter and exit during processing, the through cover includes a sealing ring fixedly disposed at the through hole, and the sealing ring is arranged concentrically with the through hole.

In a second aspect, the embodiments of the present invention further provide a method for using the BTA drilling QSD described above, including the following steps:

mounting a base on a worktable of a drilling machine to make a guide rail parallel to a main shaft;

putting a workpiece in a fixture for clamping, blocking the fixture with a stopper, and mounting a through cover, where an elastic element is compressed; and making a tool enter a hollow cavity during processing, and removing the stopper when a set position is reached during processing, where the fixture carries the workpiece to move in a direction away from a drill bit under the action of the elastic element, to rapidly separate the drill bit from the workpiece to implement quick stop.

The embodiments of the present invention have the following beneficial effects:

In the QSD provided in the present invention, the processing condition of a closed environment required for deep hole processing is met. The workpiece can be clamped to the fixture, so that workpieces within a particular size range can be tested, thereby improving the versatility of the fixture.

In the QSD provided in the present invention, the fixture can be disposed to clamp a workpiece. The stopper disposed at the top portion of the base can extend into the cavity to cooperate with the side portion of the fixture, so as to block the fixture and prevent the fixture from moving during processing. In addition, the elastic element disposed between the through cover and the fixture can push the fixture to move after processing, so as to rapidly separate the drill bit from the workpiece to implement quick stop.

In the QSD provided in the present invention, the fixture is fixed by compression bolts, thereby reducing the surface quality requirements of the workpiece and reducing the processing cost.

In the QSD provided in the present invention, the damper is disposed in the base, which ensures that the tool does not touch the workpiece again after the elastic element pushes the fixture to hit the damper and rebounds, thereby preventing a chip root and the tool from damage.

In the QSD provided in the present invention, the compression of the spring is implemented by tightening a fastening screw of the through cover, so that the operation is simple, manpower is saved, and high safety is achieved.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

In the figures, to display the positions of parts, the distances between the parts or the sizes of the parts are exaggerated. The schematic diagrams are only for illustration:

1—base, 2—guide rail, 3—fixture, 4—ejector rod, 5—pressure spring, 6—fastening screw, 7—through cover, 8—workpiece, 9—screw clamping mechanism, 10—stopper, 11—damper, and 12—sealing ring.

DETAILED DESCRIPTION

It should be pointed out that the following detailed descriptions are all illustrative and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present disclosure. As used herein, the singular form is also intended to include the plural form unless the present invention clearly dictates otherwise. In addition, it should be further understood that, terms "comprise" and/or "include" used in this specification indicate that there are features, steps, operations, devices, components, and/or combinations thereof.

For convenience of description, the words "above" and "below" only indicate directions consistent with those of the accompanying drawings, are not intended to limit the structure, and are used only for ease and brevity of illustration and description, rather than indicating or implying that the mentioned device or element needs to have a particular orientation or needs to be constructed and operated in a particular orientation. Therefore, such terms should not be construed as a limitation on the present invention.

For the part of term explanation, terms such as "mount", "connect", "connection", and "fix", if appearing in the present invention, should be understood in a broad sense. For example, the connection may be a fixed connection, a detachable connection, an integral connection, a mechanical connection, an electrical connection, a direct connection, an indirect connection by using an intermediate medium, an interior connection between two elements, or interaction between two elements. A person of ordinary skill in the art may understand specific meanings of the foregoing terms in the present invention according to a specific situation.

As described in the BACKGROUND, in view of the deficiencies in the related art, to resolve the foregoing technical problems, the present invention provides a BTA drilling QSD and a method.

Figure 1:
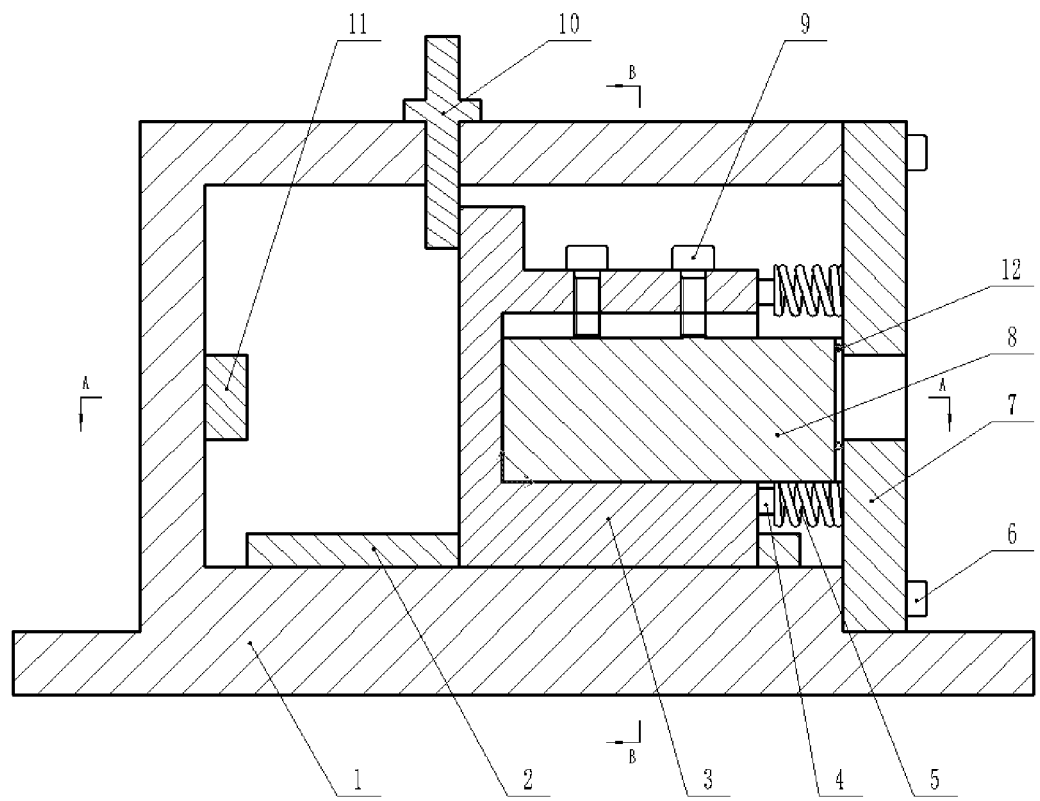
FIG. 1 is a front view of a QSD according to one or more implementations of the present invention.
Figure 2:
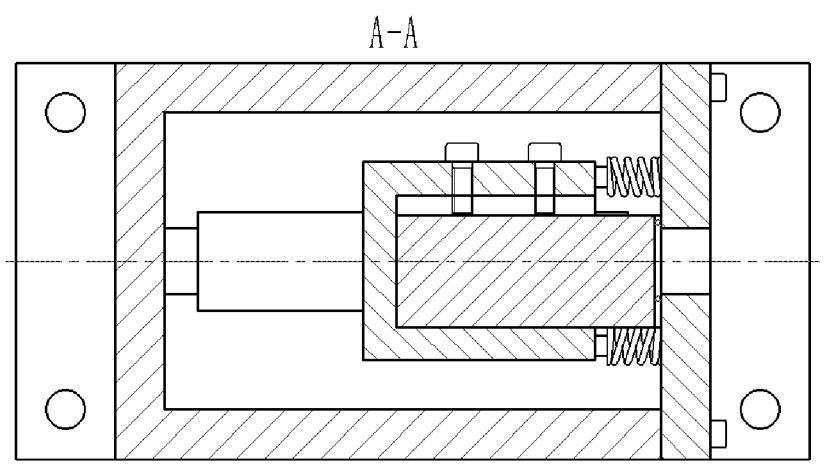
FIG. 2 is a cross-sectional view along A-A in FIG. 1.
Figure 3:
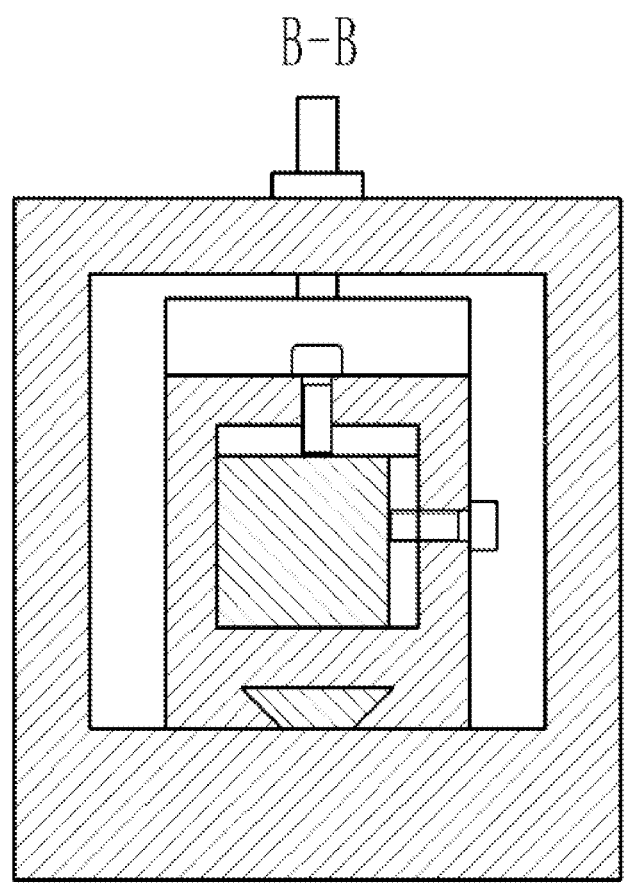
FIG. 3 is a cross-sectional view along B-B in FIG. 1.

In a typical implementation provided in the present invention, as shown in FIG. 1, a BTA drilling QSD is provided, which is a horizontal structure.

The QSD includes a base 1, a guide rail 2, a fixture 3, an ejector rod 4, a pressure spring 5, a fastening screw 6, a through cover 7, a screw clamping mechanism 9, a stopper 10, a damper 11, and a sealing ring 12.

The base 1 includes a hollow cavity. A side portion of the base is provided with an opening communicating with the hollow cavity, and the opening is closed by the through cover 7.

A longitudinal section of the base may be C-shaped.

The guide rail 2 is fixed on a lower surface of an inner portion of the cavity of the base 1, and is parallel to a main shaft of a drilling machine. In this embodiment, a section of the guide rail is dovetail-shaped.

The fixture 3 is disposed on the guide rail 2. A bottom portion of the fixture is provided with a slide chute matching the section of the guide rail 2. A lower surface of the fixture and an upper surface of the guide rail form a sliding pair. The bottom portion of the fixture cooperates with the guide rail through the slide chute, and the fixture can horizontally slide in a direction of the guide rail in a reciprocating manner.

An upper surface of the base 1 is provided with a square through hole. The stopper 10 matching the through hole passes through the through hole. The stopper extends into the cavity from an outer portion of the base.

In a further solution, a bottom portion of the stopper 10 is disposed lower than a top portion of the fixture. When the stopper blocks the fixture, a side portion of the fixture can be abutted against a side portion of the stopper, so that the stopper stops the fixture from moving along the guide rail to prevent the fixture from moving backward during processing.

The damper 11 is disposed at a middle position of a rear portion of the cavity of the base 1. The damper is disposed on a side wall provided with no opening in the cavity of the base, to absorb a force exerted on a rear wall of the cavity of the base after the fixture is bounced by the spring. The damper is a block structure.

In the present invention, the front and rear are defined with the base as a reference. A side provided with the opening to match the through cover of the base is the front side, and the opposite side is the rear side.

The fixture 3 is a C-shaped structure as a whole. The fixture includes an accommodating space for accommodating a workpiece 8. The side portion of the fixture is provided with an opening, and the opening in the side portion of the fixture communicates with the accommodating space for the workpiece to extend out of the fixture.

The opening in the side portion of the fixture is arranged in a same direction with the opening in the side portion of the base. That is, the fixture is disposed in the cavity of the base. In addition, the opening in the side portion of the fixture and the opening in the side portion of the base face the same direction.

The screw clamping mechanism is disposed at the top portion and the side portion of the fixture 3 to clamp the workpiece. Specifically, each of the top portion and the side portion of the fixture is provided with two threaded holes.

The workpiece 8 is disposed in the accommodating space of the fixture. The screw clamping mechanism 9 is disposed in the threaded holes in coordination to clamp the workpiece on the side portion and the top portion of the workpiece.

The screw clamping mechanism may adopt a hexagon socket head cap screw. The hexagon socket head cap screw is screwed into the threaded holes of the fixture, so that a screw head is in contact with a surface of the workpiece to implement clamping of the workpiece.

The opening in the side portion of the base is closed by the through cover 7. The through cover is a plate structure. Each of four corners of the through cover is provided with a through hole. The fastening screw 6 is pressed at the opening of the cavity of the base, so that the cavity is made a closed environment. After the fixture clamps the workpiece, the workpiece extends out of the fixture. An end portion of the workpiece rests against a side portion of the through cover. In addition, a position of the workpiece corresponds to a position of the through hole in the through cover. The sealing ring 12 is additionally mounted between the workpiece and the through cover. Specifically, the sealing ring may be fixed on the through cover. The sealing ring is disposed at the through hole in the through cover, and arranged concentrically with the through hole.

A middle part of the through cover 7 is provided with a circular through hole for a drill bit to enter and exit during processing. A position of the through hole in the through cover corresponds to a position of the opening in the side portion of the fixture. During processing, the drill bit enters through the through hole in the through cover to perform drilling on the workpiece clamped by the fixture.

An elastic element is disposed between the through cover and the side portion of the fixture. The elastic element adopts the pressure spring 5. The pressure spring is fixed at a side portion of the through cover. The pressure spring is fixedly connected to the ejector rod 4. The ejector rod is abutted against the side portion of the fixture. In this way, the elastic element can push the fixture on the guide rail to move.

In the present invention, four pressure springs are disposed. The ejector rod connected to the pressure springs is abutted against four corners of the side portion of the fixture.

During use, the device provided in the present invention is mounted and fixed on a worktable of the drilling machine to make the guide rail parallel to the main shaft. The workpiece is put in the fixture and clamped by the screw clamping mechanism 9. The fixture is blocked with the stopper 10, and the through cover is closed. The through cover is pressed tight at the opening of the cavity of the base 1 with the fastening screw. In a process of screwing the screw, the pressure spring is compressed. During processing, a coolant supply is rested against the through cover. A tool enters the inner portion of the cavity through the through hole at the center of the through cover. When a proper position is reached during processing, the stopper 10 is pulled out. Under the action of an elastic force of the pressure spring, the fixture carries the workpiece to move along the guide rail in a direction away from the drill bit, to rapidly separate the drill bit from the workpiece to implement quick stop. In this way, a chip root sample of relatively high quality can be obtained.

The present invention has a compact structure, stable work, and simple and practical operations. The present invention satisfies the requirement of sealing in BTA drilling, and resolves the problem of extracting a chip root in BTA drilling.

The foregoing descriptions are merely preferred embodiments of the present invention, but are not intended to limit the present invention. A person skilled in the art may make various alterations and variations to the present invention. Any modification, equivalent replacement, or improvement made and the like within the spirit and principle of the present invention shall fall within the protection scope of the present invention.

What is claimed is:

1. A boring and trepanning association (BTA) drilling quick-stop device (QSD), comprising a base, wherein the base comprises a hollow cavity, a side portion of the base is provided with an opening communicating with the hollow cavity, the opening is closed by a through cover, a horizontally movable fixture is disposed in the hollow cavity, a stopper is disposed at a top portion of the base, a bottom portion of the stopper is disposed lower than a top portion of the fixture to stop the fixture from moving during processing, and an elastic element is disposed between the through cover and a side portion of the fixture to push the fixture to move after processing; wherein
   the fixture is configured to be a C-shaped structure as a whole, and comprises an accommodating space for accommodating a workpiece, the side portion of the fixture is provided with an opening, and the opening in the side portion of the fixture communicates with the accommodating space for the workpiece to extend out of the fixture; wherein,
   the opening in the side portion of the fixture is arranged in a same direction with the opening in the side portion of the base.

2. The BTA drilling QSD according to claim 1, wherein the top portion of the base is provided with a through hole, the stopper extends into the hollow cavity through the through hole from an outer portion of the base, and the side portion of the fixture is abutted against a side portion of the stopper when the stopper blocks the fixture.

3. The BTA drilling QSD according to claim 1, wherein the elastic element comprises a pressure spring, the pressure spring is fixed at a side portion of the through cover, the pressure spring is fixedly connected to an ejector rod, and the ejector rod is abutted against the side portion of the fixture.

4. The BTA drilling QSD according to claim 1, wherein a screw clamping mechanism is disposed at the top portion and the side portion of the fixture to clamp a workpiece at a side portion and a top portion of the workpiece.

5. The BTA drilling QSD according to claim 1, wherein the base comprises a damper disposed at a rear portion of the cavity.

6. The BTA drilling QSD according to claim 1, wherein a guide rail is fixedly disposed in the hollow cavity, and a slide chute is disposed at a bottom portion of the fixture to cooperate with the guide rail.

7. The BTA drilling QSD according to claim 1, wherein the through cover is provided with a through hole for a drill bit to enter and exit during processing, the through cover comprises a sealing ring fixedly disposed at the through hole, and the sealing ring is arranged concentrically with the through hole.

8. A method for using the BTA drilling quick-stop device (QSD) according to claim 1, comprising the following steps:
   mounting the base on a worktable of a drilling machine to make a guide rail parallel to a main shaft of the drilling machine;
   putting the workpiece in the fixture for clamping, blocking the fixture with the stopper, and mounting the through cover, wherein the elastic element is compressed; and making a drill bit enter the hollow cavity during processing, and removing the stopper when a set position is reached during processing, wherein the fixture carries the workpiece to move in a direction away from the drill bit under an action of the elastic element, to rapidly separate the drill bit from the workpiece to implement a quick stop.

* * * * *